(12) United States Patent
Yanagihara (10) Patent No.: US 6,616,226 B2
(45) Date of Patent: Sep. 9, 2003

(54) CHILD SAFETY CAR SEAT ASSEMBLY

(76) Inventor: Lyle C. Yanagihara, 1441 Kapiolani Blvd., #111, Honolulu, HI (US) 96814

( * ) Notice: Subject to any disclaimer, the term of this patent is extended or adjusted under 35 U.S.C. 154(b) by 0 days.

(21) Appl. No.: 09/855,611

(22) Filed: May 15, 2001

(65) Prior Publication Data

US 2002/0171274 A1 Nov. 21, 2002

(51) Int. Cl.[7] .................................................. B60N 2/28
(52) U.S. Cl. ...................................................... 297/250.1
(58) Field of Search ............................. 297/130, 250.1, 297/468, 254, 256.16, 255, 256, 440.2, 440.21

(56) References Cited

U.S. PATENT DOCUMENTS

| | | | |
|---|---|---|---|
| 3,116,069 A | 12/1963 | Dostal | 280/30 |
| 3,404,917 A | 10/1968 | Smith | 297/250 |
| 3,550,998 A | 12/1970 | Boudreau et al. | 280/31 |
| 3,690,525 A | 9/1972 | Koons | 224/9 |
| 3,829,113 A | 8/1974 | Epelbaum | 280/30 |
| 3,922,035 A | 11/1975 | Wener | 297/250 |
| 4,186,961 A | 2/1980 | Farrell, Jr. et al. | 297/216 |
| 4,306,749 A | 12/1981 | Deloustal | 297/440 |
| 4,634,177 A | 1/1987 | Meeker | 297/250 |
| 4,679,852 A | 7/1987 | Anthony et al. | 297/363 |
| 4,750,783 A | 6/1988 | Irby et al. | 297/250 |
| 4,768,795 A | 9/1988 | Mar | 280/30 |
| 4,915,446 A | 4/1990 | Darling et al. | 297/250 |
| 5,121,965 A | 6/1992 | Skold et al. | 297/250 |
| 5,292,176 A * | 3/1994 | Artz | 297/250.1 |
| 5,385,386 A | 1/1995 | Beamish et al. | 297/256.16 |
| 5,524,965 A | 6/1996 | Barley | 297/256.16 |
| 5,527,094 A * | 6/1996 | Hiramatsu et al. | 297/250.1 |
| 5,556,162 A | 9/1996 | Raffini | 297/256.15 |
| 5,673,969 A | 10/1997 | Frazier | 297/256.15 |
| 5,676,386 A | 10/1997 | Huang | 280/30 |
| D402,235 S | 12/1998 | Haut | D12/129 |
| 5,857,832 A | 1/1999 | Al-Temen et al. | 414/921 |
| 5,893,606 A | 4/1999 | Chiang | 297/118 |
| 6,000,753 A | 12/1999 | Cone, II | 297/256.16 |
| 6,030,047 A * | 2/2000 | Kain | 297/250.1 |
| 6,070,890 A | 6/2000 | Haut et al. | 280/47.38 |
| 6,099,022 A | 8/2000 | Pring | 280/648 |
| 6,139,101 A | 10/2000 | Berringer et al. | 297/256.1 |
| 6,378,950 B1 * | 4/2002 | Takamizu et al. | 297/250.1 |

FOREIGN PATENT DOCUMENTS

| | | |
|---|---|---|
| DE | 41 11 010 A1 | 4/1992 |
| GB | 1 512 370 | 6/1978 |
| GB | 1 546 772 | 5/1979 |
| GB | 2 040 237 A | 8/1980 |
| GB | 1 595 570 | 8/1981 |
| GB | 2 085 817 A | 5/1982 |
| GB | 2 099 294 A | 12/1982 |
| GB | 2 166 691 A | 5/1986 |
| GB | 2 211 082 A | 6/1989 |

* cited by examiner

Primary Examiner—Peter R. Brown
(74) Attorney, Agent, or Firm—Woodard, Emhardt, Moriarty, McNett & Henry LLP (57) ABSTRACT

A child safety seat system having a child seat, a separable mounting plate, and a stroller frame incorporating a mounting plate. The mounting plate attaches to an automobile or similar seat by means of a standard adult seat belt. The child seat may be coupled to the separable mounting plate or the stroller frame mounting plate for transporting a child securely.

2 Claims, 8 Drawing Sheets

CHILD SAFETY CAR SEAT ASSEMBLY

FIELD OF THE INVENTION

The present invention relates to child restraint devices designed to transport children, and more specifically to apparatus and methods for utilizing a car seat in both a car and on a stroller.

BACKGROUND OF THE INVENTION

Child safety seats are know for transporting children in automobiles, while strollers or buggies are known for transporting children over walking distances. As many trips include both driving and walking portions, these trips have traditionally required the use of both a child safety seat and a stroller.

At least two problems are posed with to the transportation of children over both walking and driving portions of a journey. First, the parent may purchase two separate pieces of equipment, such as a car seat and a stroller. Second, the parent may remove the child from a seated position when transitioning from one mode of transportation to the other. The child may be unbuckled from the car seat, removed from the car seat, placed in the stroller seat and strapped into the stroller when transitioning from the riding to the walking portion of a trip. This multi-step transition is stressful to the child, especially if the child has fallen asleep in the car seat during the ride portion of the journey.

Previous attempts to produce a child seat which may be moved between a car seat and a stroller frame involve complicated locking and unlocking mechanisms that must be manipulated by the parent when transferring the child seat from a car seat to a stroller. There is a need for a child seat which utilizes a simple mechanism in the transition from car to stroller transportation. The present invention does this in a novel and unobvious way.

SUMMARY OF THE INVENTION

One embodiment of the present invention is a child restraint device comprising a child seat adapted to be slideably engaged with a mounting plate which may be anchored to an adult car seat by means of a seat belt.

A further embodiment of the present invention pertains to a child seat having movable padded cushions to allow for repositioning to better support the child.

Yet another embodiment of the present invention pertains to a stroller frame equipped with a mounting plate which allows the child seat to be moved from a car to the stroller frame without removing a child from the seat.

Further objects, embodiments, forms, benefits, aspects, features and advantages of the present invention may be obtained from the description, drawings and claims provided herein.

DESCRIPTION OF THE PREFERRED EMBODIMENT

For the purposes of promoting understanding of the principles of the invention, reference will now be made to the embodiment illustrated in the drawing and specific language will be used to describe the same. It will nevertheless be understood that no limitation of the scope of the invention is thereby intended, and alterations and modifications in the illustrated device, and further applications of the principles of the invention as illustrated therein being contemplated as would normally occur to one skilled in the art to which the invention relates.

The present invention relates to a portable car seat for a child. In one embodiment of the present invention, a child seat is equipped with open vertical channels on the right and left sides of the seat back. The preferred embodiment includes a U-shaped open channel along the top of the seat back, but other embodiments contemplate a seat back without a U-shaped channel. Preferably the tops of the vertical channels are closed, and the innermost side of the channel (near the central part of the seat back) is open, so that the channels are three-sided.

The child seat is preferably made of rigid molded plastic and incorporates a standard restraint mechanism such as straps or a harness to secure the child in the seat. In another embodiment the child seat incorporates adjustable cushions to allow for better support and comfort of the child. As one example, these cushions are placed on the upper part of the back where they provide lateral support to the child's head. The adjustable cushions are preferably, removable from the child seat. In one embodiment the cushions are secured to the child seat by reusable hook and eye fasteners such as Velcro®. Other fastening means such as zippers, buttons, and snaps are also contemplated.

The vertical channels of the car seat are sized to accept a mounting plate. In the preferred embodiment, the mounting plate is adapted to be attached to a seat in a car by an adult seat belt. In one embodiment, the mounting plate is attached to the seat by passing the seat belt through two vertically arranged slots in the mounting plate. The mounting plate may be attached using a standard shoulder harness style seat belt or lap belt. The present invention also contemplates attachment of the mounting plate to adult seats not equipped with a seat belt by means of a removable harness or straps.

Once the mounting plate is secured to an adult seat the child seat may be engaged with the mounting plate. The vertical channels on the back of the child seat slide over the mounting plate preferably until the base of the child seat rests on the surface of the adult seat. It is also preferred that when fully engaged, the top of the mounting plate is in contact with the top of the vertical channels. In one embodiment the child seat incorporates handles or hand holds to facilitate placement and removal of the child seat on the mounting plate.

Another embodiment of the present invention relates to a stroller frame which incorporates a mounting plate. A generally planar mounting plate is attached to the stroller back. Preferably there is a gap between the mounting plate and the stroller back large enough to allow the child seat to fully engage the mounting plate. In one embodiment the stroller frame is collapsible to allow for easy storage when not in use. The mounting plate is preferably fixed to the stroller frame, but other embodiments of the present invention contemplate a mounting plate which is removable from the stroller frame. In the preferred embodiment, the mounting plate for the car and the mounting plate for the stroller are substantially equal in size and of a similar shape. This allows for the child seat to be easily removed from one mounting plate and engaged with the other with minimal effort by the user and with minimal disturbance to the child in the seat. In another embodiment, the mounting provisions for the car and the mounting provisions for the stroller are different in size and/or shape, but both fit the open channels of the back of the child seat.

It is understood that the present invention is not limited to use in automobiles. The present invention may be adapted to any mode of transportation which employs adult seats. For example, the mounting plate of the present invention may be used in modes of transport such as airplanes, watercraft, and trains which utilize adult-sized seats and seat belt restraints. A separate strap may be used to adapt the present invention for use in modes of transport such as subway trains which utilize adult-sized seats but lack seat belt restraints.

Figure 1:
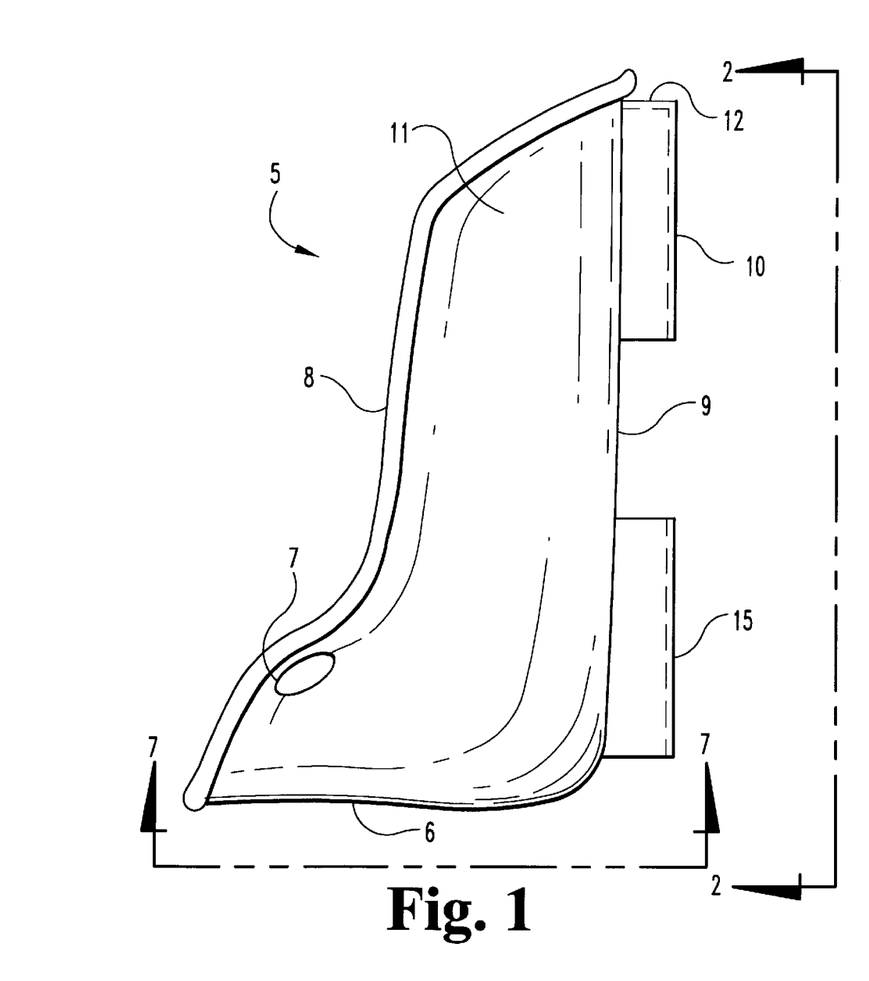
FIG. 1 is a side elevational view of a child seat according to one embodiment of the present invention.

The embodiment of the present invention as seen in FIG. 1 consists of a child safety seat 5 sized to accommodate a child ranging from an infant to approximately fifty pounds in size. The child seat 5 is designed to attach to the adult seat in a vehicle (not shown) by means of a mounting plate 20. The child seat 5 consists of a rigid outer shell 11 having lateral walls 8, a base 6, and a back 9. One embodiment of the child seat 5 incorporates lift handles 7 to facilitate removal and placement of the seat.

Figure 2:
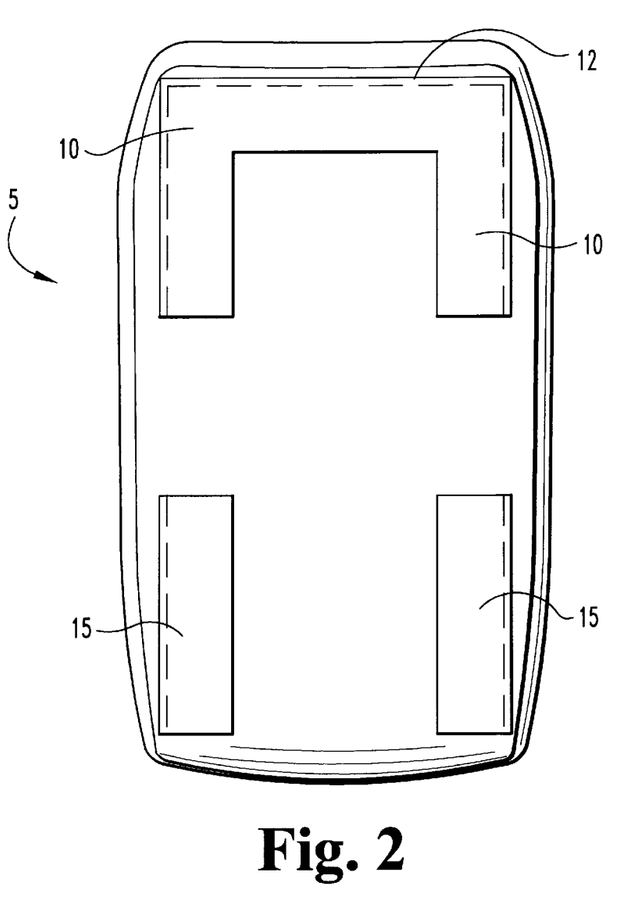
FIG. 2 is a rear view of the child seat of FIG. 1 as taken along line 2—2 of FIG. 1.
Figure 11:
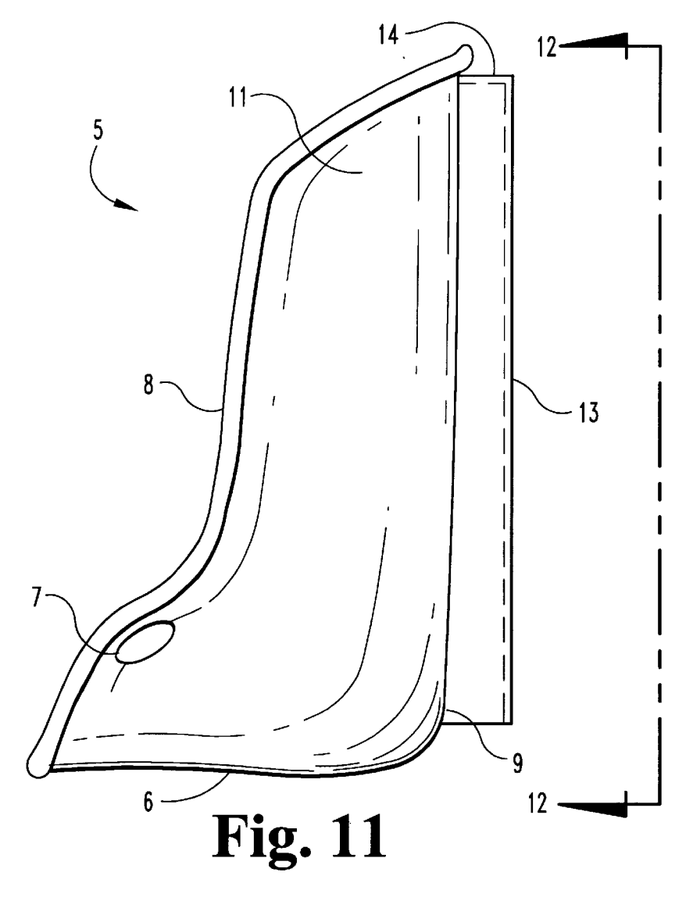
FIG. 11 is a side elevational view of a child seat according to another embodiment of the present invention.
Figure 12:
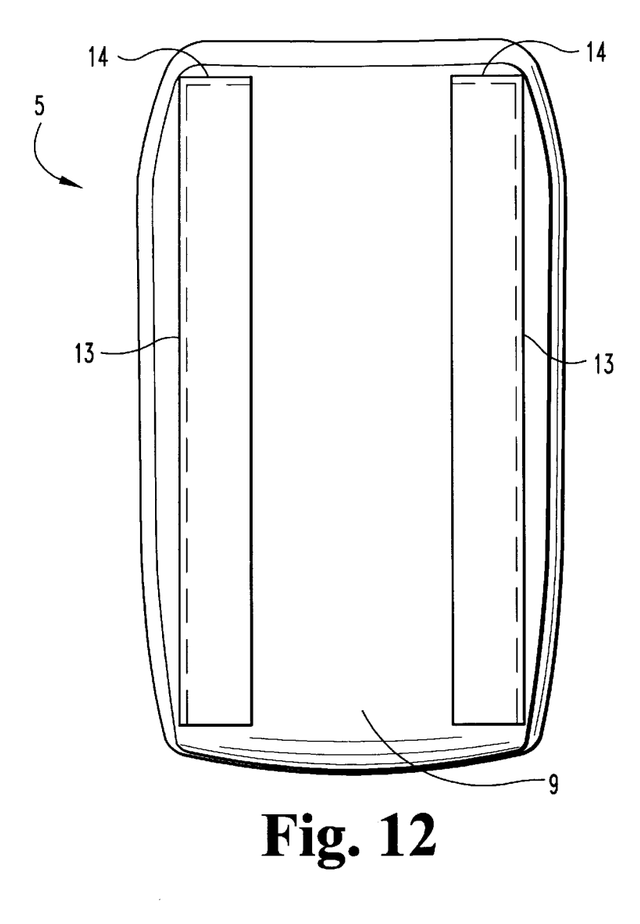
FIG. 12 is a rear elevational view of the child seat of FIG. 11 as taken along line 12—12 of FIG. 11.

At least a pair of mounting channels are attached to the child seat back 9. Several configurations of mounting channels are contemplated under the present invention. Referring to FIG. 2, one embodiment of the present invention utilizes a single U-shaped upper mounting channel 10 attached proximate the top side of seat back 9 and a pair of lower mounting channels 15 attached to each side of the seat back 9. Preferably the upper mounting bracket 10 includes a closed upper end 12. As another example, embodiment depicted in FIG. 12 incorporates two vertically arranged mounting brackets 13, one arranged on each side of the seat back 9. Preferably each mounting bracket 13 also includes a closed upper end 14 as shown in FIG. 11 to limit the sliding motion of a mounting plate within the channels.

Figure 3:
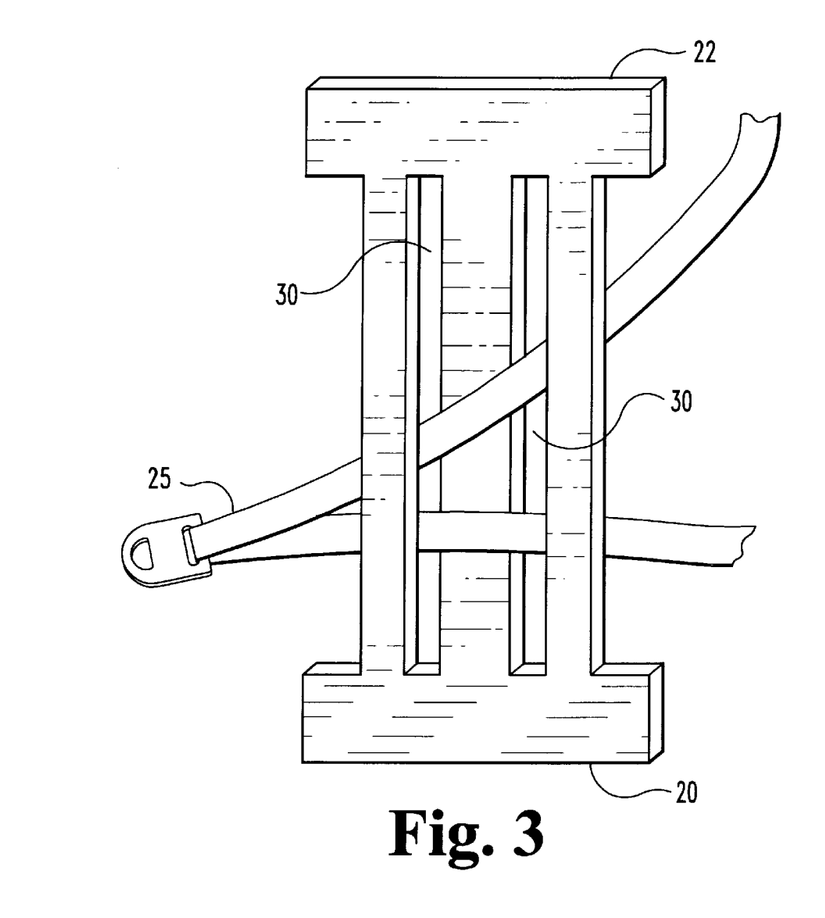
FIG. 3 is a front perspective view of a mounting plate engaged with a shoulder harness type seat belt according to one embodiment of the present invention.
Figure 4:
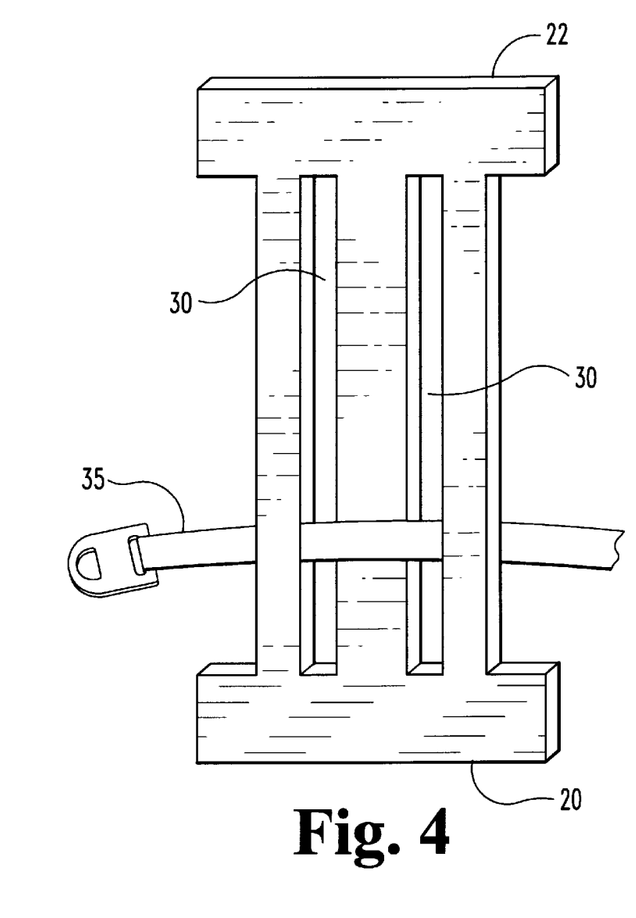
FIG. 4 is a front perspective view of a mounting plate engaged with a lap belt type seat belt according to one embodiment of the present invention.

FIG. 3 illustrates one embodiment of a mounting plate 20 for securing a child seat according to the present invention to an adult car seat. One embodiment of the mounting plate 20 preferably includes two vertical slots 30 adapted to receive a shoulder harness type seat belt 25. The present invention also contemplates the use of a lap type seat belt 35 as shown in FIG. 4. The present invention further contemplates the use of other means such as straps or harnesses for securing the mounting plate to an adult seat which lacks a seat belt such as those found in a subway train or on a bus.

Figure 7:
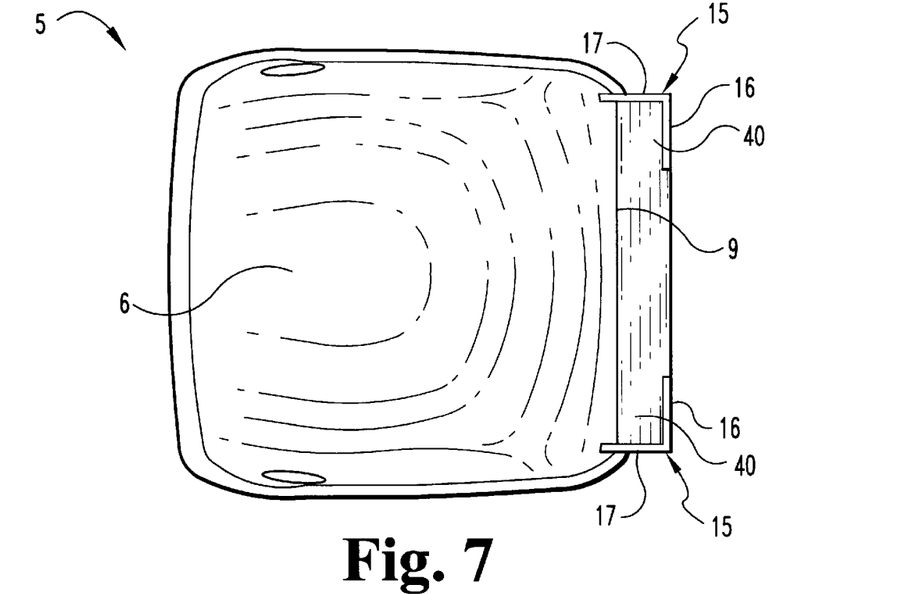
FIG. 7 is a bottom plan view of the child seat of FIG. 1 as shown along line 7—7 of FIG. 1.
Figure 8:
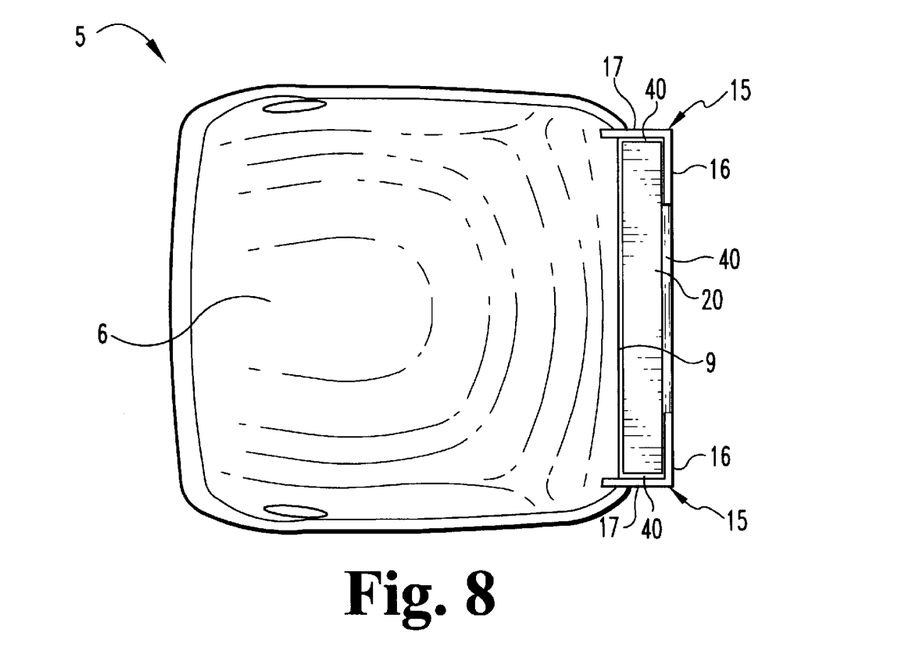
FIG. 8 is a bottom plan view of the child seat engaged with the mounting plate of FIG. 5 as shown along line 8—8 of FIG. 5.

According to the embodiment of the present invention in FIG. 7, channel 15 is preferably U-shaped with an outer portion 16 and a side portion 17. The portions of the channel facing the interior of the seat back are removed so as to slidably accept the mounting plate. The channel outer portion 16, channel side portion 17, and the seat back 9 form a mounting plate receiving channel 40. Preferably the mounting plate receiving channel 40 is only slightly larger than the width of the mounting plate 20 so that when engaged, the mounting plate 20 is securely held in the channel 40 as show in FIG. 8.

Figure 9:
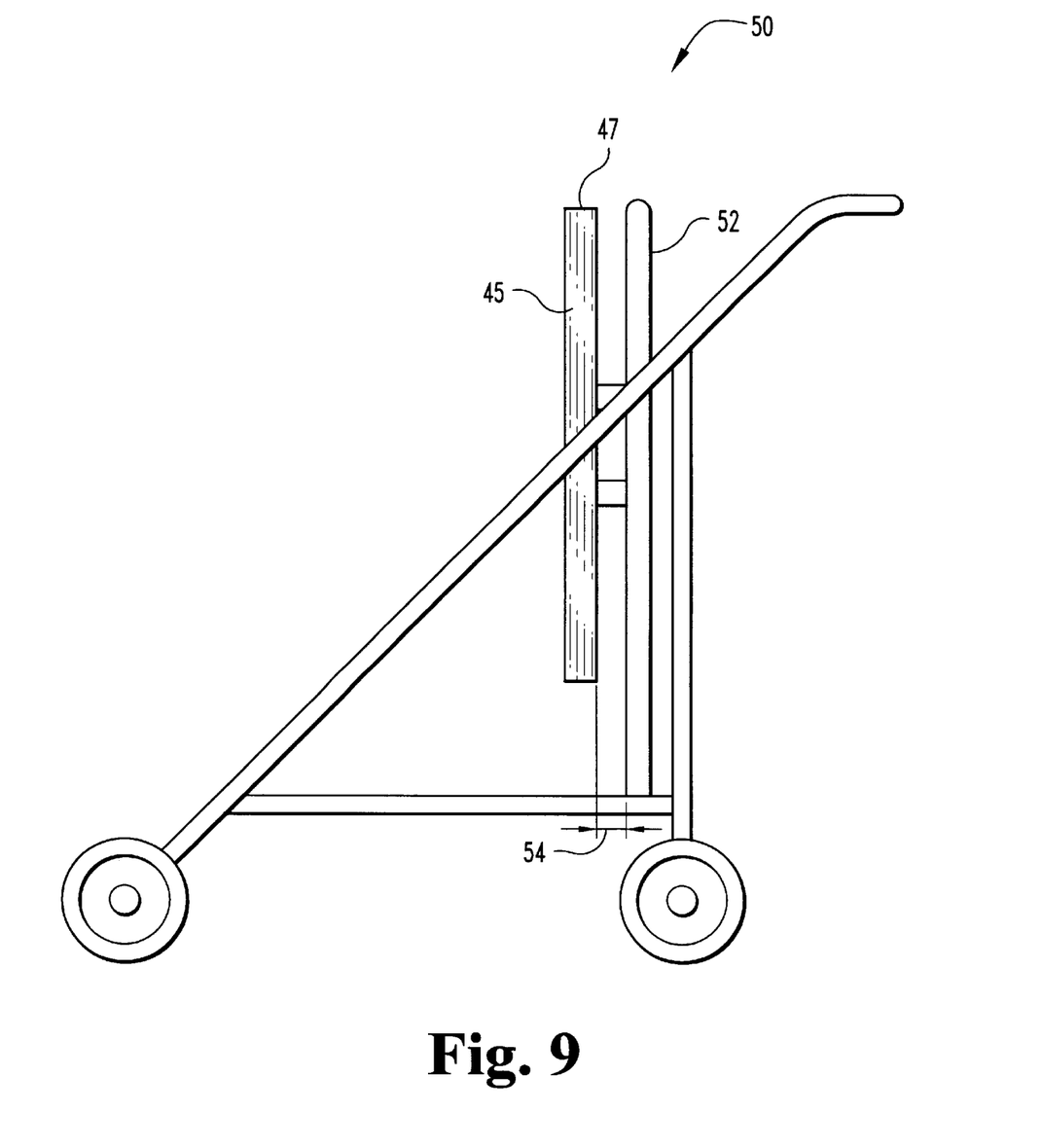
FIG. 9 is a side elevational view of a stroller frame equipped with a mounting plate according to one embodiment of the present invention.
Figure 10:
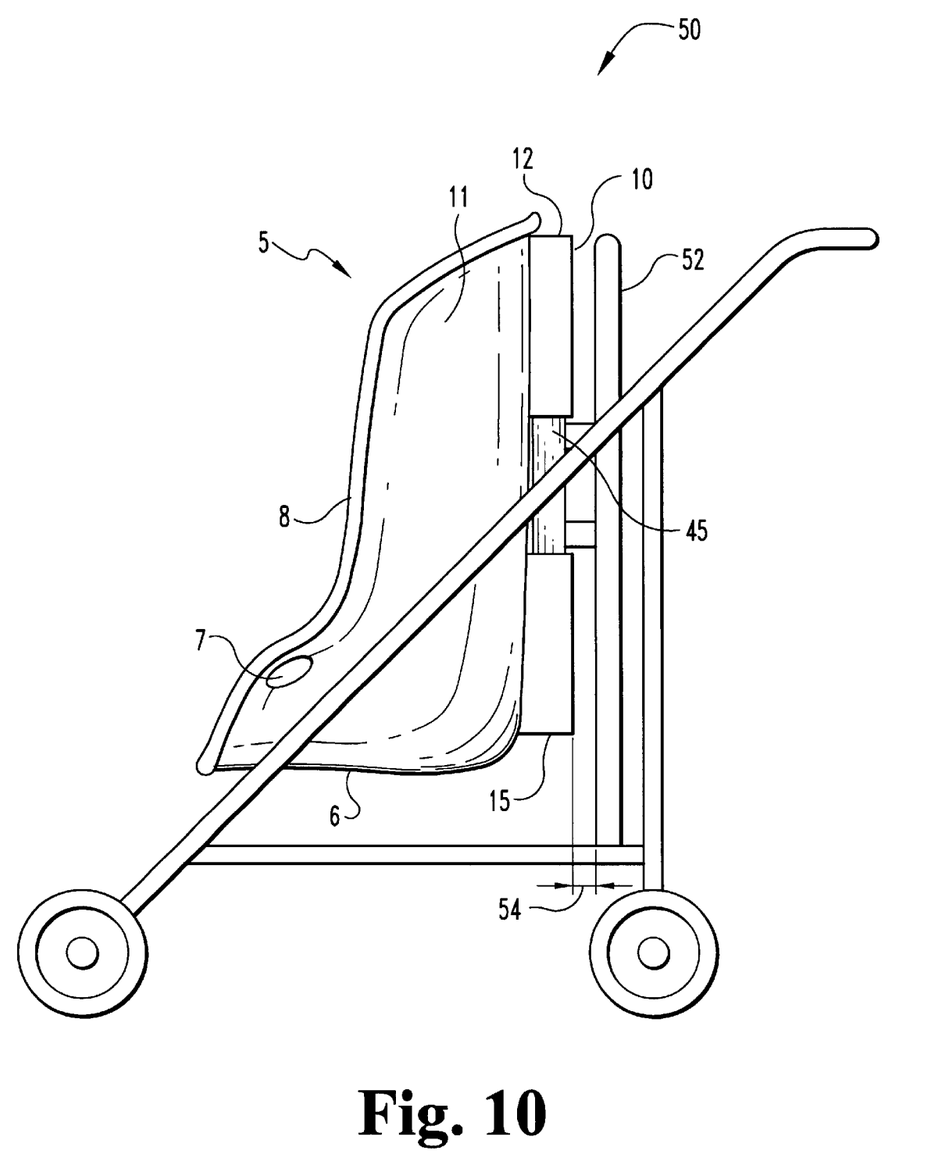
FIG. 10 is a side elevational view of the stroller of FIG. 9 with a child seat engaged with the mounting plate.

The present invention also contemplates a stroller frame 50 as illustrated in FIG. 9. According to one embodiment, a stroller frame 50 preferably with a back 52 has a generally planar mounting plate 45 attached to the stroller back 52. The mounting plate 45 is preferably fixed to the stroller back 52. The mounting plate 45 is also preferably mounted a sufficient distance 54 from the stroller back 52 to allow engagement of a child seat 5 according to the present invention with the mounting plate 45 as shown in FIG. 10. Other embodiments of the present invention contemplate stroller backs which are inclined, mounting plates which are releasably attached to the stroller back, so that a single mounting plate can be used in both a vehicle and on a stroller.

The operation of the present invention will now be described. The following is a description of an adult user employing the present invention to transport a child in an automobile for the first portion of a journey followed by a transition to a stroller frame according to the present invention. This example is for illustrative purposes only. Use of the present invention in circumstances other than an automobile is understood to be substantially similar to the following description.

Figure 5:
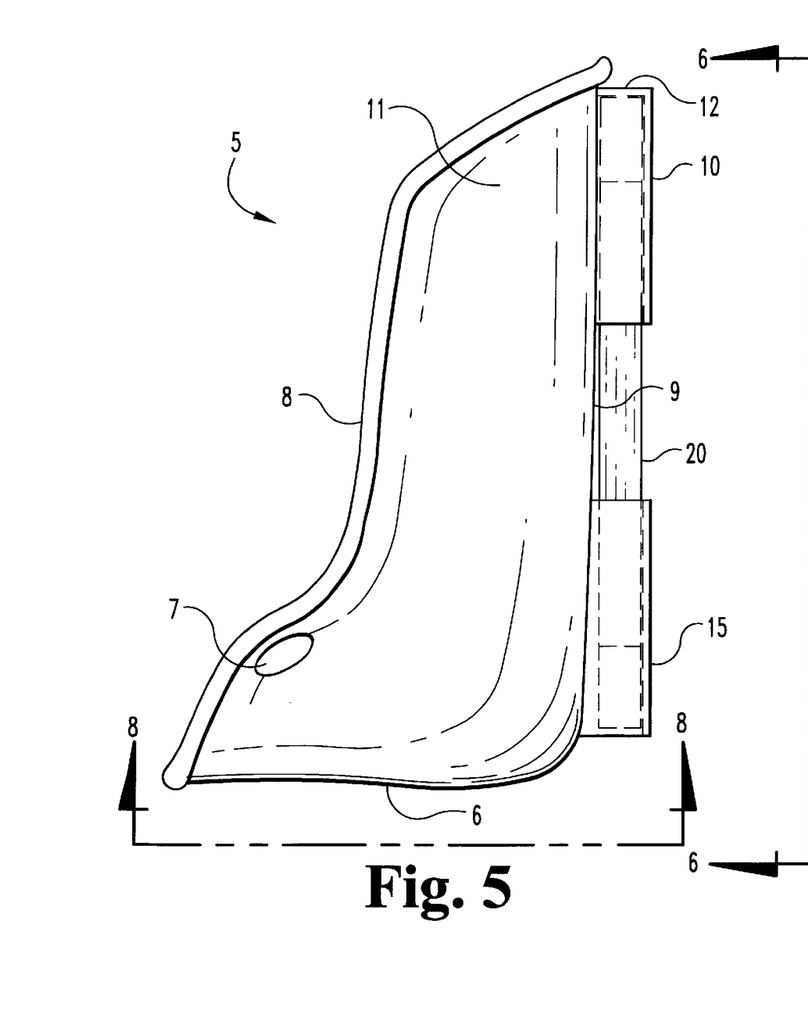
FIG. 5 is a side view of the child seat of FIG. 1 engaged with a mounting plate.
Figure 6:
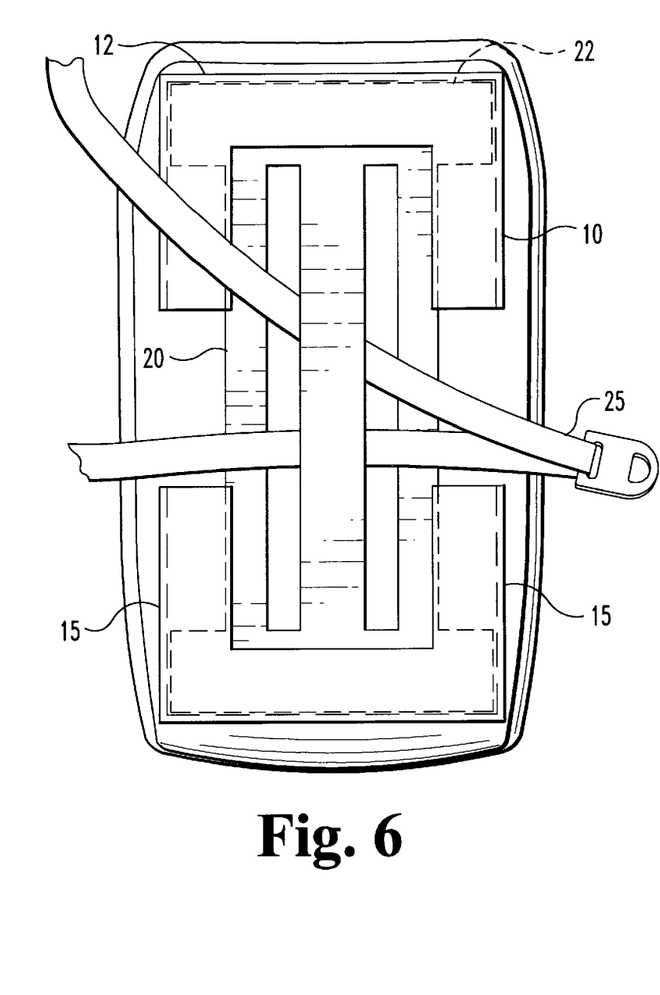
FIG. 6 is a rear view of the child seat engaged with the mounting plate from FIG. 5 as shown along line 6—6 of FIG. 5.

An automotive seat belt 25 is passed through the vertical receiving slots 35 of the mounting plate 20 as shown in FIG. 3. A child (not shown) is secured in the child seat 5 by a standard harness or similar restraint method. Preferably the child seat is lifted using the lift handles 7 and maneuvered into the automobile. The child seat 5 is lifted above the mounting plate 20 so that the open bottoms of the mounting plate receiving channel 40 is aligned with the mounting plate 20. The child seat is then lowered so that the mounting plate 20 slidingly engages the mounting plate channel 40 as illustrated in FIG. 5 and FIG. 6. Preferably the child seat is lowered until the seat base 6 rests on the surface of the adult automobile seat. It is also preferred that when the mounting plate is fully engaged, the upper end of the mounting bracket 12 rests on the upper edge of the mounting plate 22. After the child has been secured to the car seat, cushions 60 are moved to positions which provide comfort and support to the child.

To remove the child seat, the user preferably grasps the lift handles 7 and raises the child seat 5 vertically until the sides of mounting plate 20 are fully disengaged from the receiving channel 40. The child seat may then be maneuvered out of the automobile. Preferably the child remains secured to the child seat during the transition.

To employ the present invention as a stroller, the child seat 5 is positioned so that the bottom of the mounting plate receiving channel 40 is aligned with the top of the stroller mounting plate 45. The child seat is then lowered so that the stroller mounting plate 45 engages the mounting plate channel 40. Preferably the child seat is lowered until the upper end of the mounting bracket 12 rests on the upper edge of the mounting plate 47.

Figure 13:
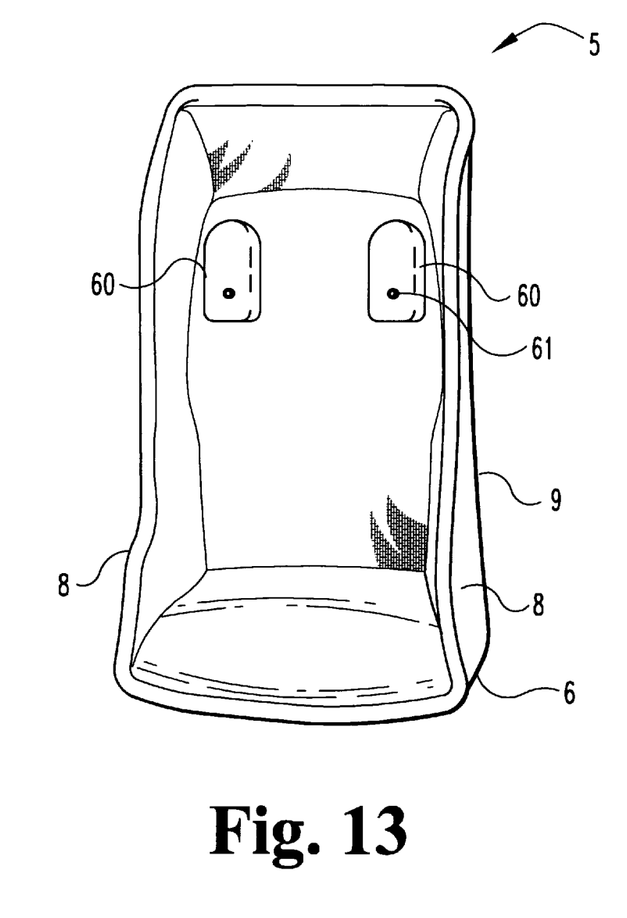
FIG. 13 is a front perspective view of a child seat according to another embodiment of the present invention.
Figure 14:
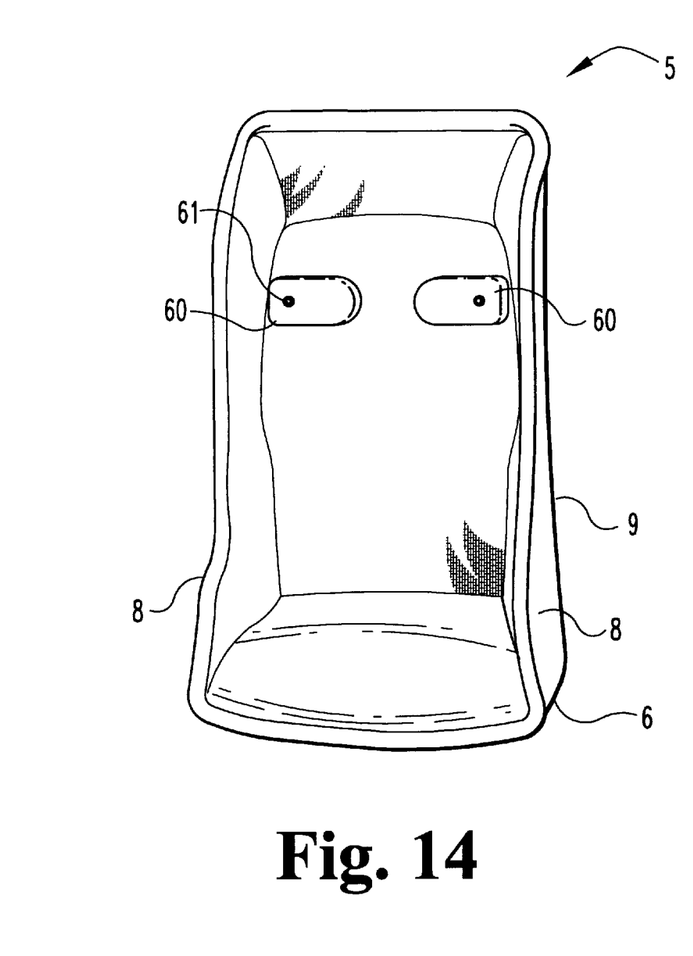
FIG. 14 is a front perspective view of the child seat of FIG. 13 with the cushions rotated to another position.

FIGS. 13 and 14 depict another embodiment of the present invention which incorporates a pair of releasable, rotatable cushions 60. Each cushion 60 is movable to a variety of positions to accommodate the sitting child. Preferably, cushions 60 are placed on the upper part of the back of seat 5 where they provide lateral support to the child's head. In one embodiment, cushions 60 are pivotally attached to the back of seat 5 by snap fasteners 61, and are pivotable about snap fasteners 61. However, other embodiments of the present invention include buttons, Velcro ®, zippers, and other fastening means.

While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the inventions disclosed are desired to be protected.

What is claimed is:

1. An apparatus comprising:

a portable car seat for a child, said car seat including a seat bottom and a seat back, said seat back having a front side adapted and configured to support the back of a child, said seat back having right and left sides and a rear side, said rear side including a first vertically arranged channel proximate the right side and a second vertically arranged channel proximate the left side;

a separable mounting plate defining a pair of slots adapted and configured to slidably receive a car seatbelt therethrough, said mounting plate including a first vertical edge adapted and configured to be slidably received within said first channel and a second vertical edge adapted and configured to be slidably received within said second channel; and wherein said seat back includes a top side and said rear side includes a third horizontally arranged channel proximate said top side and said mounting plate includes a top edge adapted and configured to be slidably received within said third channel.

2. The apparatus of claim 1, wherein said car seat is a rigid molded seat.

* * * * *